United States Patent
Leith et al.

[11] 3,838,903
[45] Oct. 1, 1974

[54] WAVEFRONT RECONSTRUCTION

[75] Inventors: Emmett N. Leith, Plymouth; Juris Upatnieks, Ann Arbor, both of Mich.

[73] Assignee: The Battelle Development Corporation, Columbus, Ohio

[22] Filed: Dec. 7, 1970

[21] Appl. No.: 95,497

Related U.S. Application Data

[60] Division of Ser. No. 505,652, Oct. 29, 1965, Pat. No. 3,548,643, which is a continuation-in-part of Ser. No. 503,993, Oct. 23, 1965, Pat. No. 3,580,655, which is a continuation-in-part of Ser. No. 361,977, April 23, 1964, Pat. No. 3,506,327.

[52] U.S. Cl. .................. 350/3.5, 350/162 SF, 355/2
[51] Int. Cl. ............................................ G02b 27/00
[58] Field of Search .......... 350/3.5, 162 R, 162 SF; 96/27 H; 340/5 H; 355/2

[56] References Cited
UNITED STATES PATENTS

| | | | |
|---|---|---|---|
| 2,492,738 | 12/1949 | Gabor | 350/3.5 |
| 2,770,166 | 11/1956 | Gabor | 350/3.5 |
| 2,805,599 | 9/1957 | Pajes | 350/3.5 |
| 2,982,176 | 5/1961 | Kay | 350/3.5 |
| 3,506,327 | 4/1970 | Leith et al. | 350/3.5 |

OTHER PUBLICATIONS

Smith; Principles of Holography, Wiley-Interscine, 1969, pp. 24, 25.
Leith et al., Jour. of the Opitcal Society of America, Vol. 52, No. 10, Oct. 1962, pp. 1,123-1,130.
Rogers, Proc. of the Royal Society of Edinburgh, Sec. A., Vol., 63, 1950-1951, pp.193-221,(Especially pp. 209, 215-218).

*Primary Examiner*—Ronald J. Stern
*Attorney, Agent, or Firm*—Woodcock, Washburn, Kurtz & Mackiewicz

[57] ABSTRACT

The invention is directed to methods and apparatus for capturing various patterns of electromagnetic energy emanating from or as they are transformed after passing through an object and reproducing or reconstructing those patterns in their original configuration to produce images identical in appearance to the object itself.

17 Claims, 22 Drawing Figures

EMMETT N. LEITH
JURIS UPATNIEKS
*INVENTORS*

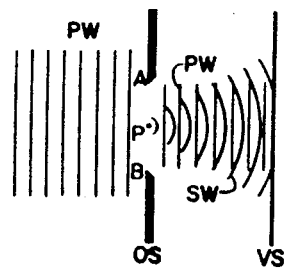
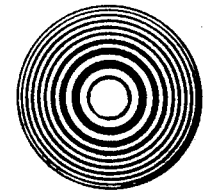
Fig. 5    Fig. 6
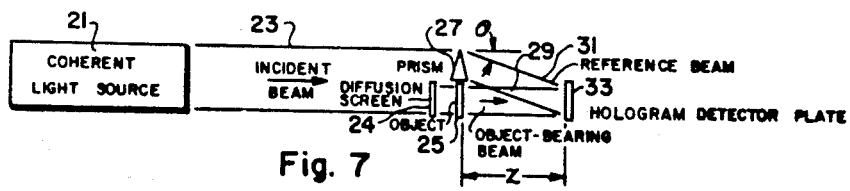
Fig. 7
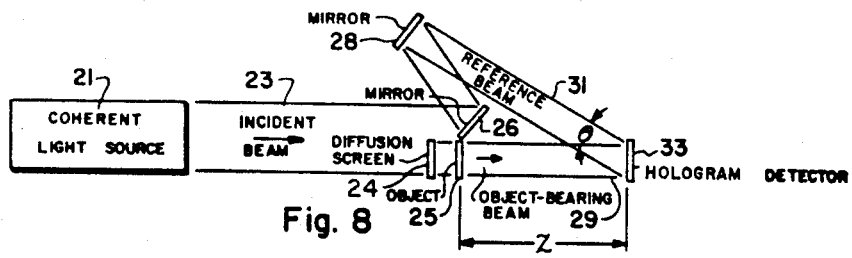
Fig. 8
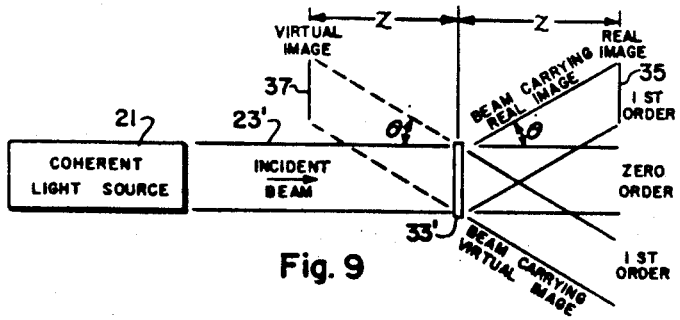
Fig. 9
EMMETT N. LEITH
JURIS UPATNIEKS
INVENTORS

EMMETT N. LEITH
JURIS UPATNIEKS
*INVENTORS*

WAVEFRONT RECONSTRUCTION

This application is a division of application Ser. No. 505,652, filed Oct. 29, 1965, now U.S. Pat. No. 3,548,643, which is a continuation-in-part of application Ser. No. 503,993 filed Oct. 23, 1965 now U.S. Pat. No. 3,580,655, which is a continuation-in-part of our copending application entitled "Wavefront Reconstruction Using a Coherent Reference Beam" Ser. No. 361,977, filed Apr. 23, 1964, now U.S. Pat. No. 3,506,327.

This invention concerns methods and apparatus for producing images without lenses. More particularly, it relates to methods and apparatus for capturing various patterns of electromagnetic energy emanating from or as they are transformed after passing through an object and reproducing or reconstructing those patterns in their original configuration to produce images identical in appearance to the object itself.

The usual method of producing images is by using lenses, or groups of lenses, whereby a light ray is bent or refracted when it strikes the boundary between two transparent substances. In most instances, the two transparent substances are air and a form of glass. The laws that explain the phenomena of reflection and refraction are grouped under a field of study known as geometrical optics. There are other interesting characteristics of light, and the explanation of these depends on the assumption that light consists of waves. The effects that depend upon the wave character of light are classified under the field known as physical optics. Although this invention is based upon principals of both geometrical and physical optics, the explanation of the basic concept is, in general, to be found in the field of physical optics.

The problem of producing clear images, three-dimensional images, colored images, enlarged images, etc., has long been attacked by attempting to provide better lenses, better film emulsion, multiple exposures, and other similar techniques and materials. Usually an image is produced by attempting to reconstruct the light patterns as they exist at the surface of the object. Thus, if one can substantially reproduce all the points on the surface of an object, either as light and dark points or as colored points, the image is considered good. Conventionally a lens system, or an optical system is used to bend light rays emerging (by reflection or other means) from a point on an object to produce a corresponding point separated in space from the original. A collection of such points forms an image. In seeking to provide a well-constructed image, much time and money are required in prior processes to correct optical system aberrations and to select materials that produce fewer defects in the process of light reflection and transmission.

One object of this invention is to provide a method of recording electromagnetic wavefronts emanating from or through an object and reconstructing the wavefronts substantially identical to their original form.

Another object of this invention is to provide a method of reproducing recorded wavefront information.

Another object of this invention is to provide a type of microscope that can operate without lenses.

In this invention, the wavefronts of light rays emerging from an object are captured by a detecting device (preferably a photographic plate or film) to form a pattern and the wavefronts are reconstructed from, and focused by, the detection device to produce an image that has the same characteristics as an image produced by the original object and an aberration-corrected optical system. According to the present invention, if one moves the eye around in the area where the reconstructed wavefronts are focused, one does not see clearly those points that were on a direct line between the object and the detecting device, but one sees new points come into view as others go out of view, so that one can look "behind" or around structures in the foreground to see structures in the background. The phenomenon gives one the impression that the image is created by a lens system and that the original object is still present, as stated above, or that one is looking through a window at the original object or scene.

Briefly described, this invention includes a method and apparatus for producing images without lenses comprising, illuminating an object with a source of coherent light, positioning a detecting device to receive light from the object, positioning means for directing a portion of the coherent light onto the detecting device to produce a pattern, and illuminating the pattern on the detector with coherent light to reconstruct a three-dimensional virtual image and a three-dimensional real image.

The pattern recorded on the detecting device is, for convenience, called an off-axis hologram or hologram. For convenience, in the description that follows, the coherent radiation is most frequently referred to as "light" since this is generally more comprehensible than other forms of radiation; however, it should be understood that visible and invisible radiation will, in most instances, be applicable to the methods and apparatus described.

Red source of coherent light is the light produced by a laser and the preferred detector is a photographic plate. Present lasers do not produce "absolutely" coherent light, but light that is coherent over a distance that is great enough to serve the purposes of the methods and apparatus described herein. Consequently, when the term "coherent" is used herein it refers to light of about laser coherence.

The orientation of the portion of coherent light that is directed onto the detecting device determines the position of the images formed by the off-axis holograms resulting from the interference between the "object-bearing" beam and the directed on reference beam.

Each point on the object produces a pattern that extends over the entire detecting means and any portion of that pattern will reproduce that point for reconstruction of the image. Thus, the detecting means can be broken or cut into pieces and from each piece an image the same size as the original but of less intensity can be produced if the intensity of the illuminating source is the same for both forming the off-axis hologram and reproducing the light waves. However, if the illuminating light is concentrated to the size of one piece the image reproduced from that piece retains its original intensith.

The radiation for producing the off-axis hologram, as previously stated, need not be light. Any radiation that can be detected and captured by a detecting device will suffice. For example, photographic plates are sensitive to infrared, ultraviolet, X-rays and gamma-rays. The invention, therefore, operates with many "types" of radiation. With photographic plates as detectors, it is possible to produce images using radiations having wavelengths of from $10^{-11}$ cm to $10^{-1}$ cm, the visible spectrum comprising only those wavelengths in the range between $4 \times 10^{-5}$ cm (extreme violet) and $7.2 \times 10^{-5}$ cm (deep red). According to this invention, since no lenses are involved, radiation that cannot be refracted by ordinary lenses can be put to use to produce types of images heretofore impossible, for example, magnification of shadow images formed from X-rays produced from a coherent source.

One advantage of this invention is that a few changes in the system can be made to produce images either much larger than the object, or smaller than the object, as desired, thus introducing magnification or miniaturization without lenses.

Still another advantage of this invention is that it may employ detecting devices sensitive to all of the same radiations as any photographic process, whereby images may be produced with radiations outside the visible spectrum.

Still another advantage of this invention is that magnification does not depend upon an optical system. Even images formed by radiations that cannot be refracted by glass can be enlarged by the method and apparatus of this invention, since lenses need not be involved.

Still another advantage of this invention is that the detecting device may be divided into numerous pieces and each piece can be used to reconstruct the total image. Still other object and advantages of this invention will be apparent from the description that follows, the drawings, and the appended claims.

Figure 4:
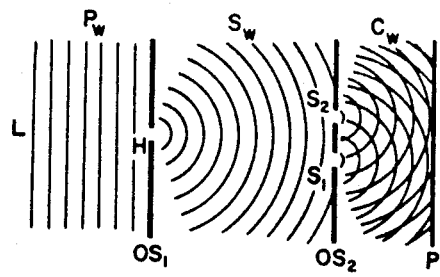
Figure 3:
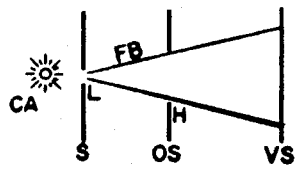
Figure 3:
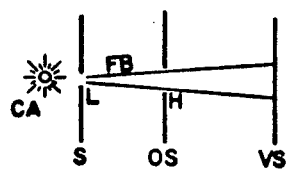
Figure 3:
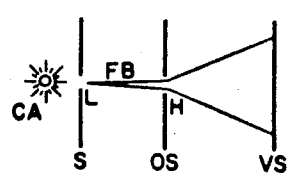
Figure 10:
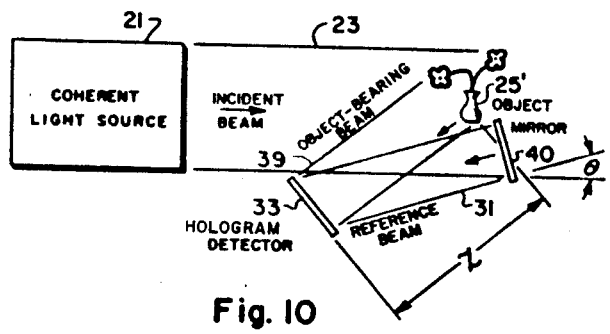
Figure 11:
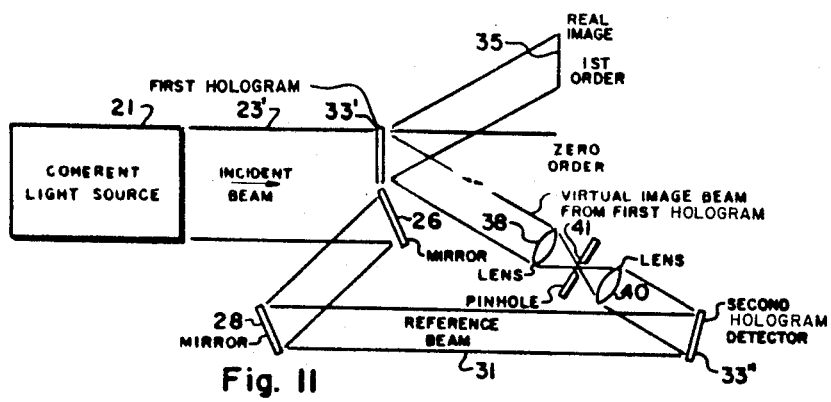
Figure 12:
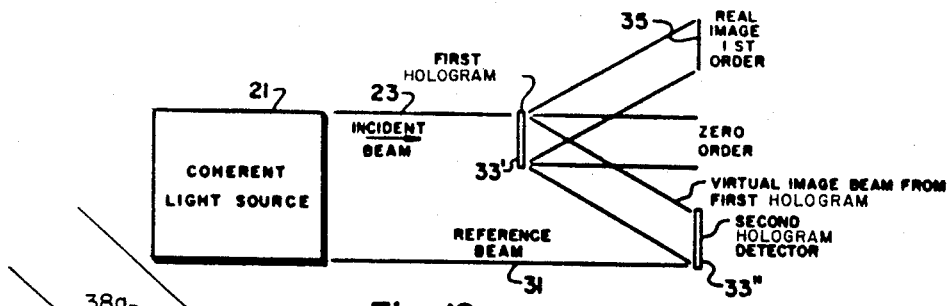
Figure 11A:
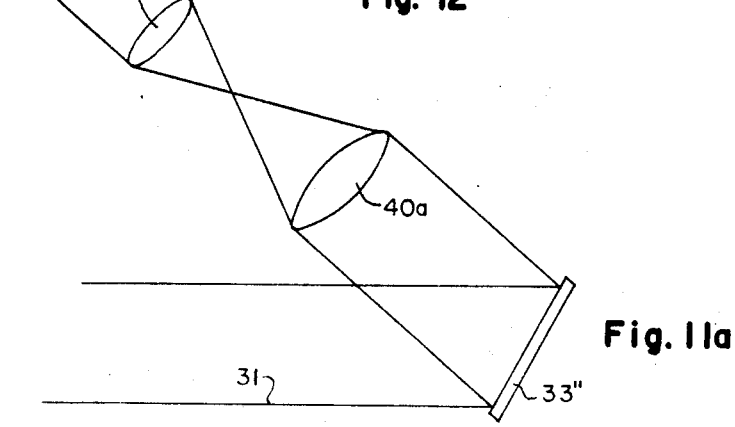
Figure 13:
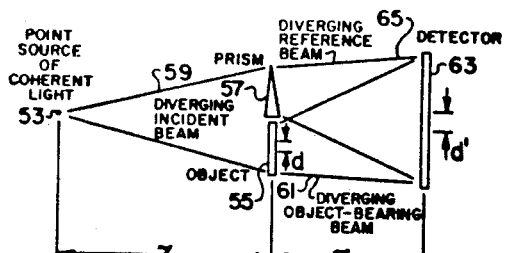
Figure 14:
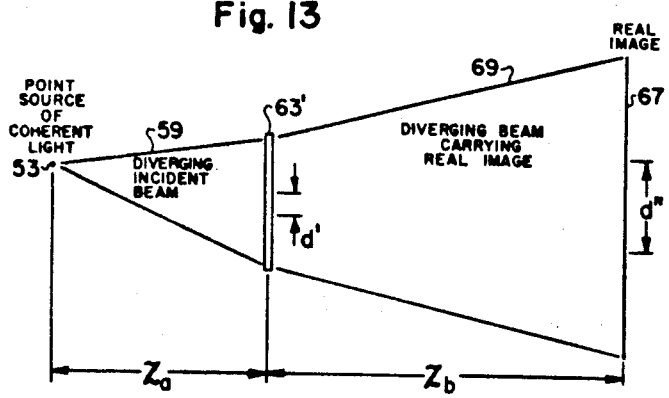
Figure 15:
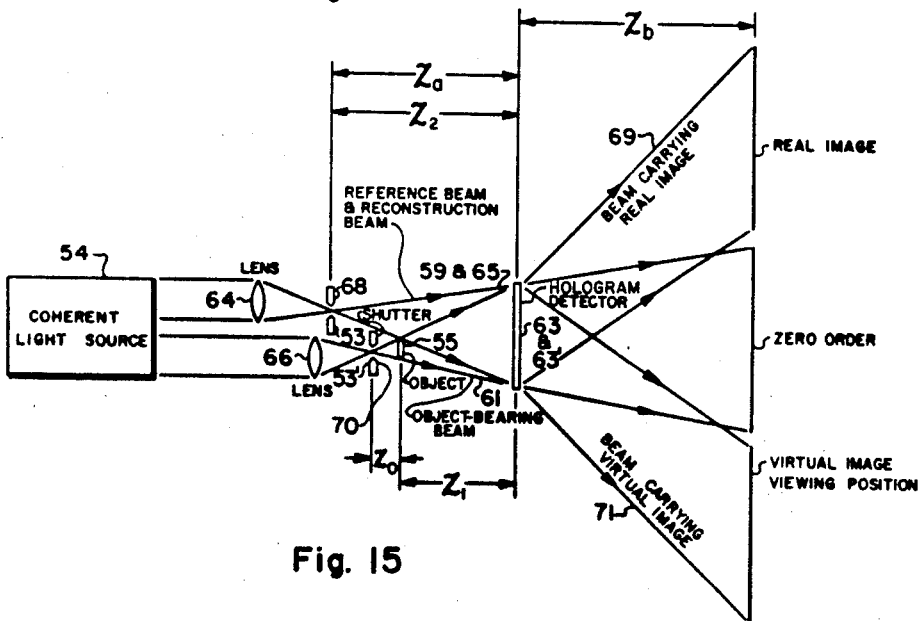
Figure 16:
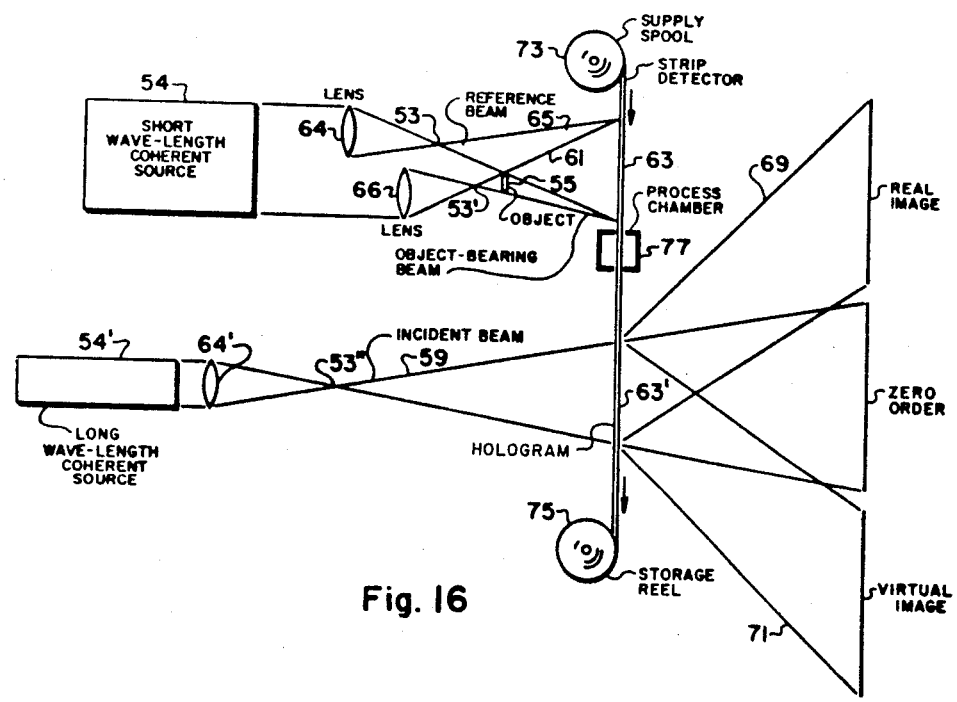
Figure 17:
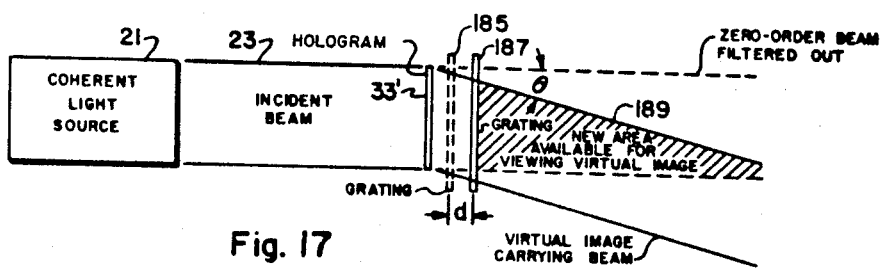
Figure 18:
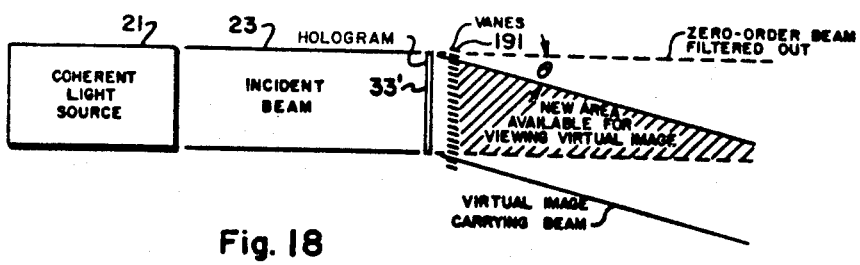
Figure 19:
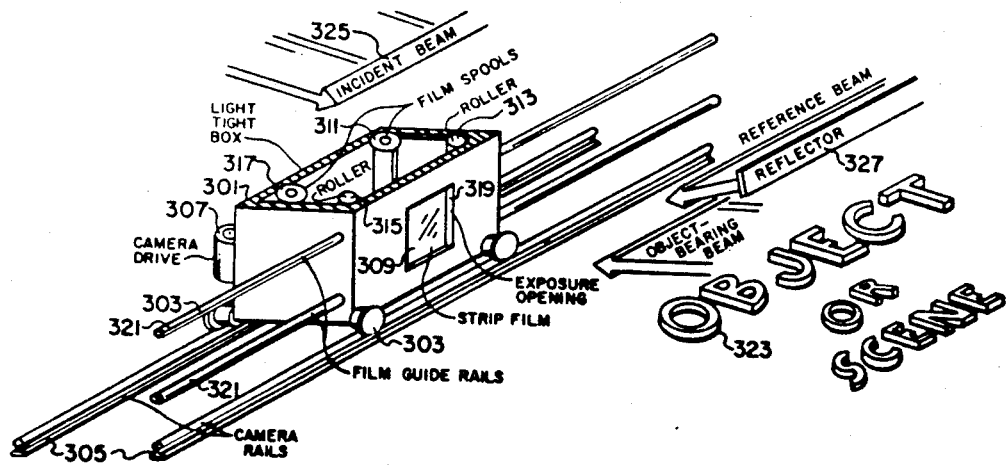

FIG. 3 (a) (b) and (c) are diagrams for demonstrating the diffraction of light;

FIG. 4 is a diagram showing the interference of light from a coherent source passing through two slits;

FIG. 5 is a diagram based on the theory of diffraction of light;

FIG. 6 is a diagram of a Fresnel zone plate;

FIG. 7 is a diagram illustrating a method for producing an off-axis hologram;

FIG. 8 is a diagram illustrating a method similar to that of FIG. 7 for producing an off-axis hologram;

FIG. 9 is a diagram illustrating a method for reconstructing the images from an off-axis hologram;

FIG. 10 is a diagram illustrating a method of producing an off-axis hologram from a solid object;

FIG. 11 is a diagram illustrating a method of producing an off-axis hologram from an off-axis hologram FIG. 11a is a fractional view of a modification of FIG. 11;

FIG. 12 is a diagram illustrating another method of producing an off-axis hologram from an actinogram;

FIG. 13 is a diagram showing a method of producing magnification of the image in the off-axis hologram forming step;

FIG. 14 is a diagram showing a method of magnifying the image in the reconstruction step;

FIG. 15 is a diagram of an off-axis hologram microscope;

FIG. 16 is a diagram of another embodiment of an holographic microscope;

FIG. 17 is a diagram illustrating a method of removing the zero order term in the reconstruction of an off-axis hologram;

FIG. 18 is diagram illustrating another method of removing th zero order term in the reconstruction of an off-axis hologram; and FIG. 19 is a diagram illustrating a method of producing long, strip off-axis holograms.

In order to provide a background for understanding the invention described herein, a brief discussion of certain principles in the field of physical optics is given. Amplification of these principles will be found in textbooks dealing with the subject. FIG. 1–6 are related to the invention only in that they are used to illustrate certain details of this discussion intended to provide background information preliminary to the actual description of the invention.

According to the theory of wave motion, the passage of a train of waves through a medium sets each particle of the medium into motion. Wave motions can be studied by determining the action of such particles as they are passed by the waves. For example, a particle of water, although participating in the formation and destruction of a passing wave, does not travel with the wave but, ideally, moves up and down in the crest and trough of the waves as it passes. A periodic motion is one which repeats itself exactly in successive intervals of time. At the end of each interval, the position and velocity of the particle is the same as the initial position and velocity and the time between such occurrences is called a period. The simplest type of periodic motion along a straight line is one in which a displacement (designated as $y$) is given by the equation:

$$y = r \sin (\omega t + \alpha)$$

Figure 1:
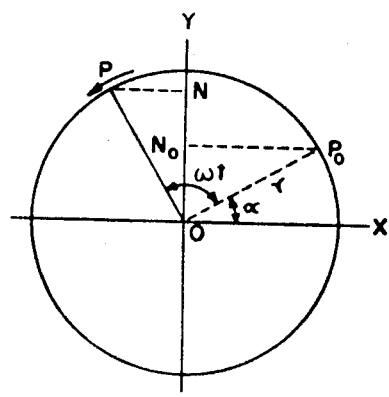
FIG. 1 is a diagram showing a reproduction of the motion of a particle influenced by a sine wave.

(1)

where $r$ is called the amplitude of the motion, $\omega$ is the angular velocity in radians per second, and $t$ is the time in seconds, and $\alpha$ is the phase constant. The entire angle $(\omega t + \alpha)$ determines the position of the particle (N) at any instant and is called the phase angle or simply "the phase". The position of N at zero time ($t = 0$) is determined by the angle $\alpha$ which is the initial value of the phase. FIG. 1 shows a construction for determining the position of the particle N at any time. This comprises a circle of radius $r$ having its center at the origin of a coordinate system. The horizontal projection of point P moving on the circumference of such a circle at a constant angular velocity $\omega$, reproduces th displacement of a particle influenced by a sine wave. Point Po, corresponding to the position of the particle at time $t = 0$ is displaced from the axis by an angle and magnitude of the initial displacement is represented by the distance $N_o$ measured along the Y axis. After a period of time the position of the particle ($P_1$) will be determined by the angle $(\omega t + \alpha)$ and the displacement will be $N_1$ measured along the Y axis. As the point P moves around the circle and again arrives at $P_o$, it will have completed a "period" and its projection N will have described one complete cycle of displacement values.

Figure 2:
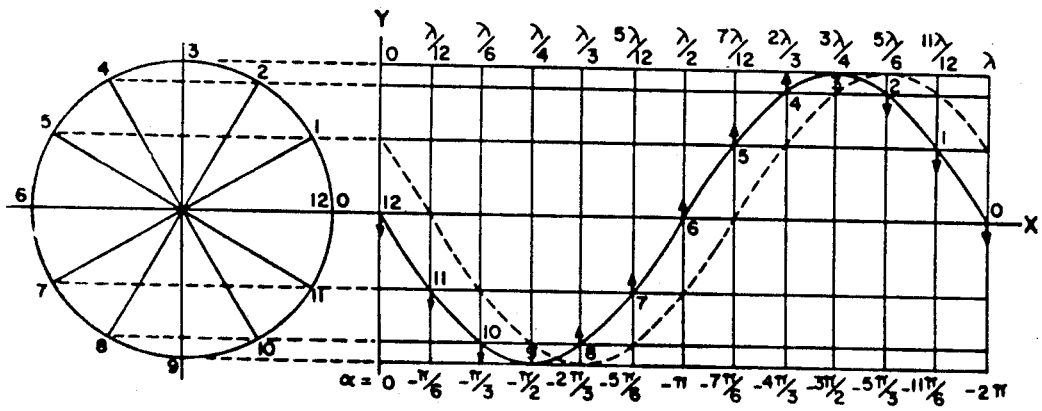
FIG. 2 is a diagram of two sine waves that are thirty degrees out of phase.

FIG. 2 shows graphically the displacement pattern of a practice through one cycle of a sine wave. A group of 12 points has been projected onto a curve, and by connecting such points a picture of the wave appears. A solid line shows a wave where the initial phase angle $\alpha$ was zero, and the broken line shows a wave where the initial phase angle was 30° or $\pi/6$. The direction of motion of the article at each position, on the solid line, is indicated by the arrows in FIG. 2. The phase difference in the two waves shown is important in that if the two waves were to be projected through the same medium and oriented along the same axis, at the same time, the result of the particle motion would be an addition of the two waves to form a compound wave. At those points where the waves tend to make the particle move in the same direction, the height or depth (intensity) of the compound wave would be increased, and, at those points where the waves tend to influence the particle to move in opposite directions, they tend to cancel each other out so that the resultant compound wave is moved toward the axis along which it travels. The entire length of the wave, or wavelength, is designated $\lambda$. In FIG. 2 the waves are out of phase by the angle $\pi/6$, in distance $\frac{1}{12}\lambda$. If they were out of phase by one-half of a period $\pi$ (or $\frac{1}{2}\lambda$), the peaks and valleys would fall in opposite directions and they would tend to cancel each other out. If the waves were exactly in phase, i.e., on top of one another, the peaks and valleys would reinforce one another so that the resultant compound wave would have twice the amplitude of either single wave.

An interesting characteristic of light is exhibited if one attempts to isolate a single "ray" of light by the method shown in FIG. 3. In FIG. 3a, a light source of the smallest possible size is represented by L which might be obtained by focusing the light from the white-hot positive pole of a carbon arc (represented by CA) on a metal screen S pierced with a small hole. This is a convenient way of approximating a "point source" of light which produces a type of coherent light. Coherent light is necessary to this invention and is described later. If another opaque screen OS, provided with a much larger hole H, is positioned between L and a viewing screen VS, only that portion of the viewing screen VS lying between the straight lines FB drawn from L will be appreciably illuminated, as shown in FIG. 3a. If the hole H is made smaller, as in FIG. 3b, the illuminated area on the screen VS gets correspondingly smaller, so that it appears that one could isolate a single ray of light by making the hole H vanishingly small. Experimentation along this line reveals, however, that at a certain width of H (a few tenths of a millimeter) the bright spot begins to widen again (FIG. 3c). The result of making the hole H very small is to cause the illumination, although very weak, to spread out over a considerable area of the screen. When waves pass through an aperture, or pass the edge of an obstacle, they always spread to some extent into the region which is not directly exposed to the oncoming waves. The failure to isolate a single ray of light by the method described above is due to the process called "diffraction". In order to explain this bending of light, the rule has been proposed that each point on a wave front may be regarded as a new source of waves. The most obvious diffraction effects are produced by opaque obstacles although diffraction is produced by obstacles which are not opaque. For example, diffraction fringes may be produced by air bubbles imprisoned in a lens. Diffraction is produced by any arrangement which causes a change of amplitude or phase which is not the same over the whole area of the wave front. Diffraction thus occurs when there is any limitation on the width of a beam of light.

If one were to drop two stones simultaneously in a quiet pool of water, one would notice two sets of waves crossing each other. In the region of crossing, there are places where the disturbances are practically zero and others where it is greater than that which would be given by either wave alone. This phenomenon, called the principle of superposition, can also be observed with light waves. FIG. 4 is diagram illustrating such a phenomenon. The light source L, effectively located at infinity (this effect can be accomplished by using a lens that collimates the light), emits parallel waves of light PW. The waves of light PW strike an opaque screen $OS_1$ having a hole H and the light that gets through the hole H diffracts to form spherical waves SW that pass to a second opaque screen $OS_2$. The second opaque screen $OS_2$ has two slits $S_1$ and $S_2$, the light waves are diffracted in a cylindrical wave front pattern as indicated by the designation CW. If the circular lines, designated CW, represent crests of waves, the intersection of any two lines represents the arrival at these two points of two waves with the same phase, or with phases differing by multiple of $2\pi$ (or $\lambda$). Such points are therefore those of maximum disturbance or brightness. A close examination of the light on the screen P will reveal evenly spaced light and dark bands or *fringes*.

The two interfering groups of light waves CW are always derived from the same source of light 1. If one were to attempt the above experiment using two separate lamp filaments set side by side, no interference fringes would appear. With ordinary lamp filaments, the light is not emitted in an infinite train of waves. Actually, there are sudden changes in phase that occur in a very short interval of time (in about $10^{-8}$ seconds). When two separate lamp filaments are used, interference fringes appear but exist for such a very short period of time that they cannot be recorded. Each time there is a phase change in the light emitted from one of the filaments, the light and dark areas of the fringe pattern change position. The light emitted from the two slits $S_1$ and $S_2$ in FIG. 4 (and other similar arrangements) always have point-to-point correspondence of phase, since they are both derived from the same source. If the phase of the light from a point in one slit suddenly shifts, that of the light from the corresponding point in the other slit will shift simultaneously. The result is that the difference in phase between any pair of points in the two slits always remain constant, and so the interference fringes are stationary. If one is to produce an interference pattern with light, the sources must have this point-to-point phase relation and sources that have this relation are called "coherent sources".

If the number of slits in the screen $OS_2$, is increased and the slits are equidistant and of the same width, the screen $OS_2$ becomes a diffraction grating. When this is done, the number of waves of the type CW increases and the number of interference points increase. The result is that the evenly spaced light and dark bands on the screen change their pattern somewhat as the number of slits is increased. The pattern is modified as the number of slits is increased by narrowing the interference maxima (so that the bright bands on the screen are decreased in width). If the screen P in FIG. 4 is a photographic plate, a series of narrow light bands is produced which may in turn serve as a diffraction grating itself. Two kinds of diffraction pattern are recognized and defined by the mathematics that treats them, i.e., Fresnel diffraction and Fraunhofer diffraction. The latter occurs when the screen on which the pattern is observed is at infinite distances; otherwise the diffraction is of the Fresnel type. This invention is mostly concerned with Fresnel diffraction.

Diffraction also occurs with an opening having an opaque point positioned in the opening. FIG. 5 shows the pattern of light waves produced when the light source is positioned at infinity and parallel waves PW arrive at an opening AB in an opaque screen OS. A point P is positioned in the opening AB and acts like a source producing a train of concentric spherical waves SW, centered at the opaque point P. These wavesets SW combine with the direct beam of waves PW to produce a series of concentric interference rings on the screen VS such as that shown in FIG. 6 wherein each white area of the pattern is equal to each of the other white areas and each are covered by a black ring which is equal to each of the other black areas. This pattern is referred to as a zone plate. If the zone plate pattern is again exposed to coherent light, it will produce a point of light of great intensity on its axis at a distance corresponding to the size of the zones and the wavelength of the light used, i.e., the light is focused by a pattern rather than a lens. The Fresnel zone plate appears to act as a type of lens. Furthermore, if a small object is positioned in the hole AB of the screen OS of FIG. 5, a Fresnel diffraction pattern is formed from the small object. It would appear that it would be possible to capture a multiple Fresnel diffraction pattern for each point on an object and pass the light through the captured multiple pattern to form an image. To a certain extent, this is true, but it is not quite so simple.

Two major difficulties are encountered if one attempts to produce an image by illuminating an object with coherent light using a point source as described above. First, the light from a point source is very weak. This difficulty is overcome by using the light emitted from a laser. Laser light has the property of point-to-point correspondence of phase, which simply means it produces the coherent light necessary for generating the Fresnel diffraction pattern. Assume that a laser beam is directed onto a photographic transparency and that a photographic plate is positioned to capture the Fresnel diffraction patterns resulting therefrom. When coherent light is directed onto the developed plate, a crude image appears. This occurs only with a relatively simple object that transmits a large portion of the light through the object without scattering. The primary difficulty with the process (and accordingly with many three-dimensional imaging processes) is that the phase of the incident beam (the beam directed onto the transparency) is lost. This, in general, makes the reconstruction of an image impossible. If a portion of the light passing through the transparency is not scattered, some of the phase is retained, so that the reconstruction of very simple objects, such as black lettering on a white background, is possible. When the object illuminated is more complicated, the loss of phase exacts its toll and light "noise" is generated so as to completely obscure the image if one attempts to reconstruct it. The above process was developed by Dr. D. Cabor of England in 1949 and the captured pattern was called a hologram of the in-line or on-axis type.

A two-beam interferometric process may be used to produce a pattern of fringes on a detecting device (such as a photographic plate), and this is called a hologram of the off-axis type. FIG. 7 shows this process in operation. A coherent light source, such as a laser 21, produces an incident beam 23 illuminating a transparency or object 25 and a prism 27. In order to produce images of improved quality, a diffusion screen 24 (such as a ground glass) is placed between a light source 21 and the object 25. The light passing through the transparency produces a beam of scattered light 29 that carries the Fresnel diffraction pattern of each point on the object 25, some of which is captured by a detector such as a photographic plate 23 positioned at a distance z from the object 25. The phase relationship in the beam 29 is almost completely destroyed. The prism 27 bends the other portion of the incident beam 23 through an angle $\theta$ directing a beam of light 31 onto the plate 33. This light in beam 31 has retained its phase relationship and produces a pattern of interference fringes with the Fresnel fringes being transmitted in beam 29. The result is a combination of multiple Fresnel patterns and interference fringes, producing an off-axis hologram. The incident beam 23, deflected through an angle $\theta$, to form the reference beam 31, is preferably about 2 to 10 times stronger in intensity than beam 29.

FIG. 8 shows a second method of producing an off-axis hologram. The difference between the arrangement shown in FIG. 7 and that of FIG. 8 is that a first mirror 26 is positioned in the incident beam 23 and reflects a portion of the incident beam 23 to a second mirror 28 which in turn reflects the light as a reference beam 31 onto the plate 33. This produces the same result as that of FIG. 7. Still another method (not shown) is to place a beam splitter in the incident beam so that part of the light passes to the object and the other portion is reflected to a mirror that reflects light to the plate to form the reference beam.

After the photographic plate is developed, reconstruction is accomplished according to the diagram of FIG. 9. The off-axis hologram 33' is illuminated by an incident beam 23 of coherent light and a real image 35 forms at a distance z on one side of the off-axis hologram 33', and a virtual image 37 forms at a distance z on the other side of the actinogram 33'. The fine line structure off-axis hologram 33' causes the actinogram 33' to act like a diffraction grating, producing a first-order pair of diffracted waves, as shown in FIG. 9. One of these produces the real image 35, occurring in the same plane as a conventional real image, but displaced to an off-axis position through the angle $\theta$. The angle $\theta$ and the distance z will be the same in the reconstruction process as they were in the off-axis hologram-forming process if the same wavelength of light is used in both instances. The images 35 and 37 are of high quality and either the real image 35 or virtual image 37 can be photographed. The real image 35 is more convenient to use since the real image 35 can be recorded by placing a plate at the image position, determined by the distance z and the angle $\theta$, thus avoiding the need for a lens. Hence, the entire process may be carried out without lenses.

The density pattern produced on the plate 33 is such that if one wanted to produce the off-axis hologram 33' artificially, for example, by hand-drawing the appropriate pattern and photographing it onto a plate, one would do so in the following manner; each point on the object interfers with the reference beam to produce a fringe pattern in which the fringes are circular and concentric, with the outer fringes being more closely packed than the inner ones. The fringe pattern is like a section taken from the Fresnel zone plate (FIG. 6) except that the fringes are shaded, going gradually from transparent to black and then to transparent, whereas the fringes of the usual Fresnel zone plates go from transparent to black in a single, abrupt step. If an object is thought of as a summation of many points, then each point produces a pattern like the one described, but such pattern is displaced from those produced by other points in the same manner that the points themselves are displaced from each other. The off-axis hologram is thus a summation of many such zone-plate sections, and one could produce an artificial off-axis hologram by drawing a superimposed zone plate pattern. Of course, the process would be very difficult and could only be done for the simplest objects.

In the absence of the reference beam 31, the photographic plate 33 produces a conventional diffraction pattern. Let the light reflected by the object be a function S of $x$ and $y$, i.e., S($x,y$) and the photographic plate receive the light in accordance with the function $S_o$ of $x$ and $y$ $S_o(x,y)$. The function $S_o(x,y)$ is a complex quantity having both amplitude and phase, the polar form of which is $$S_o(x,y) = a(x,y)e^{j\phi(x,y)} \quad (2)$$

where $a$ is the amplitude modulus and $\phi$ is the phase of the impinging light. The photographic plate records only the amplitude factor $a$; the phase portion $e^{j\phi}$ is discarded. The conventional fringe pattern is thus an incomplete record.

The interference pattern produced when the second beam, which is called the reference beam 31, is present, is called an off-axis hologram 33' pf the off-axis type. It is characterized by the fact that the phase portion $\phi$ of the Fresnel diffraction pattern is also recorded. If the reference beam 31 has an amplitude modulus $a_o$, it will produce at the detector or photographic plate 33, a wave of amplitude $a_o e^{j\alpha r}$, where the phase term $e^{j\alpha r}$ results from the beam impinging on the plate 33 at an angle. A beam impinging on a plane at an angle $\theta$ produces (for small values of $\theta$) a progressive phase retardation factor indicated by the exponent ($j2\alpha\pi\theta/\lambda$) across this plane. Hence we have the relation $\alpha = 2\pi\theta/\lambda$.

When the reference beam is present, the light distribution at the off-axis hologram recording plane is $a_o e^{j\alpha x} + ae^{j\phi}$. Let us assume that the plate which records this distribution has a response which is linear with intensity, that is, suppose the amplitude transmittance of the plate after development to be given by $$T = T_o - kI \quad (3)$$

where I is the intensity distribution at the photographic plate 33, $$I = |a \cdot e^{j\alpha r} = ne^{j\phi}|^2 \quad (4)$$

and $T_o$ and $k$ are constants determined by the transmittance exposure characteristic of the plate. Equation 3 is, in general, a reasonable approximation to the actual characteristic over a transmittance between about 0.2 and 0.8, measured relative to the base transmittance. The resultant transmittance of the recording plate is, therefore, $$T = T_o - k \mid a_o e^{j\alpha r} + ae^{j\phi} \mid^2 = T_o - ka_o^2 - 2ka_o a \cos(\alpha x - \phi) \quad (5)$$

the plate thus behaves like a square-law modulating device producing a term $2ka_o a \cos(\alpha x - \phi)$ which is the real part of the original Fresnel diffraction pattern, modulated onto a carrier of angular frequency $\alpha$. In the absence of a diffracting object, this term represents a uniform fringe pattern produced by the interference between the two beams. When a diffracting object is present, its Fresnel diffraction pattern modulates this fringe pattern. The amplitude modulus of the diffracting pattern produces an amplitude modulation of the fringes, and the phase portion $\phi$ produces a phase modulation (or spacing modulation) of the fringes.

The present process permits the photographic plate to record both the amplitude modulus and the phase of the Fresnel diffraction pattern. The complete demonstration of this requires that the final term of equation 5 be separable from the remaining terms. The actual method for the reconstruction process has been described and discussed with reference to FIG. 9.

When the off-axis hologram 33' is placed in the collimated beam of monochromatic light, as shown in FIG. 9, the bias term $T_o - ka_o^2$ and the term $ka^2$ combine to form a reconstruction that is essentially the reconstruction produced by the pattern formed when the carrier 31 is not used. From these terms, a real image is formed at a distance on one side of the off-axis hologram 33' and a virtual image is formed at an equal distance on the other side of the off-axis hologram 33' (these are the low quality conventional images). As was previously mentioned, the fine-line structure of the off-axis hologram which causes the actinogram to act like a diffraction grating produces a pair of first-order diffracted waves from the term $ka_o a \cos(\alpha x - \phi)$. As seen from FIG. 9, the light component comprising the two off-axis images are nonoverlapping and both components are removed from the region where the conventional reconstruction occurs (these two images are the high-quality images that we seek). A comprehensive mathematical analysis supporting these contentions can be given. However, for the present purpose, if the term $ka_o a \cos(\alpha x - \phi)$ of equation 5 is rewritten in its exponential form.

$$(\tfrac{1}{2})ka_o ae^{j(\alpha r - \phi)} + (\tfrac{1}{2})ka_o ae^{-j(\alpha r - \phi)}$$

it is seen that the first exponential term is to within a constant multiplier and the exponential term $e^{j\alpha r}$, exactly the complex function that describes the Fresnel diffraction pattern produced at the plate 33 by the object 25. This term can therefore be considered as having been produced by a virtual image at a distance $z$ from the off-axis hologram 33'. The factor $e^{j\alpha}$ alters this view only in that it results in the virtual image being displaced laterally a distance proportionate to $\alpha$. The conjugate term $(\tfrac{1}{2})a^o ae^{-j(\alpha r - \phi)}$ produces the real image, which likewise is displaced from the axis, as implied by the factor $e^{-j(\alpha r - \phi)}$.

The results of the method just described are based on the square-law characteristic of the recording plate, as given by equation 3 and the proper term for the recording plate is a "square-law detector". If this relation is only approximately obtained, there will be higher-order distortion terms present On the off-axis hologram. These will, for the most part, give rise to second and higher-order diffracted waves, which, in the reconstruction process, will form additional images at greater off-axis positions, and will therefore be separated from the first-order images. Hence, while the production of higher-order diffracted waves is assumed to be a specific and approximately realized film characteristic, the actual characteristic is not at all critical to the process, and in no way is it necessary or apparently even desirable to consider controlling this characteristic.

By controlling the relative amplitude of the object-bearing beam 29, for example, by the use of attenuating filters placed in one of the beams, the contrast of the fringe pattern can be controlled. If this contrast were made sufficiently small by attenuating the object-bearing beam, then equation 3 would certainly be made to hold to great accuracy if this were desired. However, if the fringe contrast is too low, the reconstructed image will tend to be grainy. Good reconstructions are, in practice, over a wide range of fringe contrasts.

One feature of interest is that the reconstructed image is positive, that is, it has the same polarity as the original object. If the off-axis hologram is contact-printed so as to produce a negative of the original off-axis hologram, then this negative off-axis hologram also produces a positive reconstruction. However, certain freatues of the off-axis hologram are lost in reproducting an off-axis hologram by contact printing and there are more desirable methods of reproducing an off-axis hologram and such methods are described in our copending application.

FIG. 10 shows a method of producing a hologram of the off-axis type using an opaque object 25'. The illuminating light, i.e., the incident beam 23, is coherent light from a source such as a laser 21. A diffusion screen (such as the diffusion screen 24 of FIG. 7) may be placed between the light source 21 and the object 25'. The object 25', which may be any complex pattern, reflects light to a photographic plate 33, as shown by the object-bearing beam 39. A portion of the incident beam 33 is reflected to the photographic plate 33 by a mirror 40, as shown by the reference beam 31. The photographic plate is placed any distance z from the object 25' and the incident beam is reflected through the angle $\theta$. The interference of the two beams 39 and 31 produces a hologram on the photographic plate 33. After the plate 33 is developed, the semi-transparent plate 33' is placed in the beam 23 of coherent light, as shown in FIG. 9, and the virtual and real images 35 and 37 appear as three-dimensional images. Both images are a reconstruction of the original object. In the reconstruction, the images are positioned at a distance z and at angle $\theta$ as shown in FIG. 9.

The reproduction or copying of off-axis holograms is relatively difficult since they often contain spatial frequencies in the range of 300–1000 lines/mm. Contact printing, although successful to some extent, produces a copy of inferior quality when compared to the original. Imaging of the off-axis hologram cannot be done since an ordinary lens has a frequency response of 100–300 lines/mm. Off-axis holograms can be imaged, however, if the carrier frequency is removed and is reintroduced at the imaged off-axis hologram.

FIG. 11 shows a method of producing a second off-axis hologram from a first off-axis hologram. The first off-axis hologram 33' is placed in an incident beam of light 23 from a coherent source 21. A first order beam is focused by means of two lenses 38 and 40 on a detector 33'', that is, the surface of first off-axis hologram is focused on detector 33''. The lenses 38 and 40 have equal focal lengths and are spaced at a distance of twice the focal length of one lens. A pinhole 41 may be positioned at the focal point between the two lenses to reduce the effect of any aberration from lens 38. A reference beam from the coherent source 21 is also directed onto the detector 33'' by means of mirrors 26 and 28. This method removes and reintroduces the carrier frequency at the plane of the second off-axis hologram. The first off-axis hologram has information recorded in the form of $$a_o^2 + a^2 + a_o a e^{j[\phi(x,y) - \omega x]} + a_o a e^{-j[\phi(x,y) - \omega x]}$$

where $a_o a e^{\pm j \phi(x,y)}$ is the desired information-carrying term. The terms often has sufficiently low special frequency that it can be imaged by using lenses as shown in FIG. 11. The other terms of the equation are removed by spatial filtering. The reproduced off-axis hologram 33'' (second actinogram) may have a different carrier frequency and can also be magnified if desired by choosing different lenses than lenses 38 and 40. In FIG. 11a there is illustrated a magnification arrangement utilizing lenses 38a and 40a. As described above in connection with FIG. 11, a pinhole 41 may be used if desired. The second off-axis hologram 2 will have the form $$a_1^2 + a^2 + a_1 a e^{j[\phi(x',y') - \omega x']} + a_1 a e^{-j[\phi(x',y') - \omega x']}$$

and therefore has the same information as the first off-axis hologram. (The primes refer to the coordinates of the second off-axis hologram.)

Another technique of obtaining a second off-axis hologram from a first off-axis hologram is shown in FIG. 12. In this case lenses are not used. A first off-axis hologram 33' is placed in an incident beam of light 23 from a coherent source 21 and a detector 33'' is positioned in one of the reconstructed side bands. A portion of the incident beam 23 serves as a reference beam 31 to produce a second off-axis hologram on the detector 33''. The recorded virtual image from the second off-axis hologram usually gives an observer the feeling that he is viewing an object through two windows, one the size of the first off-axis hologram and the other the size of the second off-axis hologram. The advantage of the method of FIG. 12 is that it is quite simple and the spatial frequency content of the original is not restricted by lens aperature.

The invention can also be embodied in a lensless microscope by two-step imaging process. The magnifications are as great as any optical microscope and in a lensless microscope operates with little or no aberrations over a large field. Referring to FIG. 13, a point source 53 of diverfing coherent light illuminates an object 55 and a prism 57 with a diverging incident beam 59. A diverging object-bearing beam 61 is transmitted to a detector 63 and a diverging reference beam 65 reflects light onto the detector 63. The object 55 is placed at a distance $z_1$ from the point source 53 and the detector 63 is placed at a distance $z_2$ from the object.

FIG. 14 is a diagram showing the developed off-axis hologram 53' positioned in the diverging incident beam 59 originating from the point source 53 at a distance $z_a$ from the off-axis hologram 53'. A real image 67 is produced by the diverging beam 69 and may be observed or recorded in a plane at a distance $z_b$ from the off-axis hologram 53'.

To calculate the magnification of the process, note first the magnification produced in the firsstep of the process shown by the diagram of FIG. 13. Consider two-point scatterers on the object 55, spearated by a distance $d$. The Fresnel diffraction patterns of these points are similar but separated on the detector 53 by a distance, $$d' = d[(z_2 + z_1)/z_1]$$

The magnification ($M_1$) of the first step is therefore $$M_1 = d'/d = (z_2 + z_1)/z_1$$

(10)

The magnification ($M_2$) produced by the reconstruction process is less obvious. Referring now to FIG. 14, let the off-axis hologram 53' be placed at a distance $z_a$ from the source 53, and suppose a real image 67 is formed at a distance $z_b$ from the off-axis hologram. Again consider the object 55 to have had two points seaprated by $d$. Their Fresnel diffraction patterns are separated by a distance $d'$ on the off-axis hologram 63. These diffraction patterns act like a zone plate of FIG. 6, bringing the incident light from the beam 59 to a focus. Each zone plate produces a point focus, whose separation is shown as $d''$ (*FIG. 14*) *and is determined by*

$$d'' = d'[(z_a + z_b)/z_a]$$

(11)

To find the overall magnification, it is necessary to know $z_b$. Consider the distribution of the light on the object to be a function $s$ of $x$ and $y$, i.e., $s(x,y)$. The light passing the distance $z_2$ from the object to the detector and carrying the Fresnel diffraction pattern is represented by $s_o(x,y)$ and $$s_o(x, y) = s(x, y) * \frac{i}{\pi\lambda} e^{j\frac{\pi}{\lambda z_2}(x^2+y^2)}$$

*indicating convolution.

The second beam introduces a wave $e^{j\alpha x}$, and the two beams summed and square-law detected, producing $$|e^{j\alpha x} + s_o|^2 = 1 + so^2 = 2Re(s_o e^{j\alpha x})$$

In the reconstruction process, the final term produces $$s_o e^{j\alpha x} + (s_o e^{j\alpha x})*$$

*indicating that the term is a complex conjugate.

The first term is a replica of the original wave front which the plate recorded and, therefore, represents diverging wavelets and produces a virtual image. The second term represents converging wavelets and produces a real image, which, of course, can be photographed without the need for any lenses.

To continue with the calculation of the magnification, the light scattered from a point on the object produces at the actinogram the exponent $$\exp[-j(\pi/\lambda z_2)(x^2 + y^2)],$$

while for the reference beam, we have $$\exp\left\{-j\left[\frac{\pi}{\lambda(z_1+z_2)}(x^2+y^2) + \alpha\chi\right]\right\}$$

The recorded zone plate is of the form $$\cos[(\pi/\lambda)(x^2+y^2)(1/z_2) - (1/z_1+z_2) + \alpha X]$$

The recorded off-axis hologram thus has a focal length $$f_h = \frac{1}{\frac{1}{z_2} - \frac{1}{z_1+z_2}}$$

$$= \frac{z_2(z_1+z_2)}{z_1}$$

The distance $z_b$ is then found by applying the lens formula (where the reciprocal of the object distance plus the reciprocal of the image distance equals the reciprocal of the focal length of the lens) to give the zone plate $$1/z_b + 1/z_a = 1/f_h = z_1/z_2(z_1 = z_2)$$

$$1/z_b = (z_1 z_a - z_2^2 - z_2 z_1)/z_a z_2(z_1 + z_2)$$

(12)

The total magnification is $$M = M_1 M_2$$

and from equations 10 and 11 and substituting the value of $z_b$ of equation 12 into equation 11, we have $$M = [(z_1+z_2)/z_1]1 + [z_2(z_1+z_2)/(z_1 z_a - z_2^2 - z_2 z_1)]$$
$$= z_a(z_1+z_2)/[z_1 z_a - z_2(z_1+z_2)]$$

(13)

To make subsequent analysis easier, suppose that during the reconstruction step we make $z_1$ equal $z_a$, i.e., the developed off-axis hologram 63' is put back in the same position in FIG. 14 as the object in FIG. 16 had when the off-axis hologram was made. This gives, $$M = (1+p)/(1-p-p^2)$$

(14)

where $p$ equals $z_2/z_1$, and from equation 12

$$1/z_b = (1-p-p^2)/p(z_1+z_2)$$

another useful expression is $$1/z_b = (1/z_2)(1-p-p^2)/(1+p) = 1/Mz_2$$

so that $$z_b = Mz_2$$

(15)

Now $z_b$ must be positive if a real image is to be produced, and $z_1$ and $z_2$ are both positive. Therefore, it is required that $$1 - p - p^2 > 0$$

which requires that $$0 < p < (\sqrt{5} - 1)/2 \approx .62$$

The lower bound of 0 occurs because $p$ is always positive. As an example, if $p$ equals .6166 (where $z_2$ equals 30.85 mm and $z_1$ equals 50 mm) from equation 14

$$M = (1 + .6166)/[1 - .6166 - (.6166)^2] = 504 \text{ times}$$

and from equation 15

$$Z_b = 15.55 \text{ meters}$$

FIG. 15 shows a complete microscope wherein the off-axis hologram is formed and reconstructed immediately or shortly thereafter depending upon the composition of the detector. Two lenses 64 and 66 each bring an incident beam from a coherent source 54 to a separate point focus 53 and 53', respectively. A pinhole and shutter combination 68 is positioned at point focus 53 which diverges to form the reference beam 65 and the point focus 53 is positioned at a distance $z_2$ from the detector 63. A pinhole and shutter combination is also positioned at point focus 53' which diverges to illuminate the object 55 positioned at a distance $z_o$ from the point source 53'. The object 55 is positioned at a distance $z_1$ from the detector 63. The diverging-object bearing beam 61 and diverging reference beam 65 interfere to form the off-axis hologram 63' on the detector 63.

It is readily appreciated that the instrument of FIG. 15 is most useful if the detector 63 need not be removed and developed chemically. There are various self-developing films which are usable and these are divided into two classes: those which return to the original, unexposed state when, or shortly thereafter the exposing illumination is removed, and those which do not. At any length, when the detector 63 has recorded the off-axis hologram, shutter 70 is closed and the reference beam 65 becomes a diverging reconstruction beam (whose point source is positioned at a distance $z_a$ from the off-axis hologram 63') and produces the enlarged real and virtual images positioned at a distance $z_b$ from the off-axis hologram 63'. The reconstruction occurs in the same manner as shown in FIG. 9 except that the real image carrying beam 69 and the virtual image carrying beam 71 are diverging.

Enlargement of the images is also accomplished by using a short wavelength radiation for forming the off-axis hologram and reconstructing with a longer wavelength radiation. For example, one can form the off-axis hologram with X-rays and view the image with visible light, or form the off-axis hologram with blue light and view in red light. The magnification process is readily shown to be $$M = [(1/p) - (1/p)(z_1/z_2) - (\lambda_1/\lambda_2)(z_1/z_o)]^{-1} \quad (16)$$

where $\lambda_1$ is a wavelength of radiation used in making the actinogram and $\lambda_2$ is the wavelength used in reconstruction. The factor $p$ is whatever magnification is imparted to the actinogram by, for example, photographic enlargement or an electronic rescanner.

It is also possible to adapt the device of FIG. 15 so that the off-axis hologram is formed and moved to a second position where it is reconstructed, as shown in FIG. 16. A short wavelength coherent source 54 is brought to a point focus 53 by lens 64 and a point focus 53' by lens 66. Point focus 53 supplies the diverging reference beam 65 and point focus 53' illuminates object 55 to produce a diverging object-bearing beam 61. The off-axis hologram is recorded by strip detector 63, unwound from a supply spool 73 to a storage spool 75, and is removed through a process chamber 77 (unless the detector 63 is self-processing). The off-axis hologram 63' is then illiminated by a diverging incident beam 59 from a point source 53'' formed by lens 64' and the light from a long wavelength coherent source 54'. The magnification produced is a result of both diverging light and change of wavelength. The microscope could actually be used as a three-dimensional manipulating microscope with very little time lag, if the film was moved fairly rapidly and intermittently similar to movie film, and the lasers were pulsed lasers.

In some instances, especially with very large off-axis hologram several feet in height and width, one would like to form the off-axis hologram with the reference beam striking the detector at a relatively small angle with respect to the object-bearing beam. This would allow a large group of individuals to view the virtual image simultaneously and be relatively close to the off-axis hologram "window". The problem with this approach is that the zero-order terms and first-order terms of the virtual image would be overlapping resulting in a poor virtual image. FIGS. 17 and 18 show methods of allowing one to filter the zero-order term and view the virtual image (or project the real image) in the zero-order term area.

In FIG. 17, the off-axis hologram 33' is positioned for reconstruction (as in FIG. 9) with the off-axis hologram 33' illuminated by an incident beam 23 from a coherent light source 21. The angle $\theta$ on this instance was selected to be relatively small. Grids 185 and 187 are positioned "in front of" the off-axis hologram 33' at a distance d apart and are situated so that all rays from the zero-order image are blocked off by one or the other of the grids (185, 187). The grid lines are fine enough that they are invisible to the viewer, but are coarse enough that the first grid 185 does not diffract the zero-order beam around the opaque regions of the second grid 187. The shaded area 189 indicates the new area that is now available for viewing the virtual image. Such an arrangement is especially useful for three-dimensional movies and three-dimensional TV. In FIG. 18, the same result is obtained by replacing the gratings 185 and 187 with the plurality of vanes 191-191 adjusted to filter out the zero-order beam.

FIG. 19 shows a method and apparatus for producing long strip off-axis holograms. A camera or light-tight box 301 is provided with means for movement such as wheels 303 on a track 305 (the top of the box 301 is removed to show the structure inside the box). A drive mechanism 307 moves the box 301 along the track 305. A strip of film 309 passes from a first film spool 311 to rollers 313 and 315 and onto a second spool 317. A portion of the film 309 is exposed as it passes an opening 319 in the side of the box 301 or, perhaps more correctly, as the opening 319 passes the film 309. In producing an off-axis hologram the detector must be held stationary with respect to the light sources impinging upon it. This is accomplished in FIG. 19 by providing guide rails 321-321 that pass through the box 301. The rollers 313 and 315 roll along the guide rails 321-321 so that the film strip 309 is pressed onto the rails 321-321 for exposure and subsequently removed and stored after exposure with the effect that the opening 319 acts as an aperature that moves along to expose a stationary strip of film. An object or scene 320 is positioned to reflect light to the opening 319 being illuminated by a coherent light source 325 positioned behind the camera 301. A reflector 327 is positioned to provide a reference beam which it reflects to the opening 319 from the coherent source 325. The track 305 and rails 321-321 could also be curved to position the film 309 closer and farther away from the scene as the camera 301 moves along the track 305.

A portion of the off-axis hologram produced in the above manner is positioned in an incident beam of coherent light as in FIG. 9. When the strip is moved across the beam of incident light, one would get the same effect that is obtained by looking out the window of a moving automobile. The near items in the scene would be passing rather rapidly while the distant ones would stay in view for a longer period of time. Curving the track and rails would, in the reconstruction, make it appear that one approached and receded from the scene as it moved by. The width of the opening 309 is determined by the rate of camera speed along the rails and the desired exposure time.

It should be noted that the beam that illuminates the object and the reference beam described with respect to the various methods and apparatus discussed herein need not originate from a single laser since present technology includes, the ability to lock two lasers in a phase so that light from the separate lasers each produces a beam and the beams are coherent with respect to one another.

It will be understood, of course, that, while the forms of the invention herein shown and described constitute preferred embodiments of the invention, may others are possible and it is not intended herein to illustrate all of the possible equivalent forms or ramifications of the invention. It will also be understood that the words used are words of description rather than of limitation, and that various changes, such as changes in shape, relative size, and arrangement of parts or steps may be substituted without departing from the spirit or scope of the invention herein disclosed.

What is claimed is:

1. A microscope comprising:
   a. a first source of coherent radiation, said first source of radiation being separated into a first diverging beam and a second diverging beam;
   b. means for positioning and holding an object in said first diverging beam of radiation;
   c. a detector positioned to receive radiation emanating from said object;
   d. means for directing said second diverging beam of radiation onto said detector at an angle with respect to the radiation emanating from the object to said detector, said detector receiving the pattern of interference fringes produced from the second diverging beam and the radiation from said object to form an off-axis hologram;
   e. means for moving the off-axis hologram to a new position out of both said beams; and
   f. a second source of coherent radiation in the form of a diverging beam, said second source of coherent radiation being directed onto the off-axis hologram at said new position to produce two first-order diffracted beams containing enlarged images of said object, said images being enlarged due to the divergence of said beam of radiation.

2. A microscope according to claim 1 wherein said second source of radiation has a longer wavelength than said first source and an additional enlargement of said images is obtained due to the change of wavelength.

3. A method of reconstructing the virtual image of an off-axis hologram formed by recording the interference pattern of a beam of Fresnel diffraction patterns that emanate from an object interfering with a reference beam positioned at a selected angle with respect to said beam of Fresnel diffraction patterns comprising the steps of:
   a. illuminating said off-axis hologram with a source of coherent light to produce a zero-order beam and a first-order diffracted beam carrying the virtual image; and
   b. filtering out the zero-order beam to allow the virtual image to be discerned in the area of the zero-order beam.

4. Apparatus for filtering out the zero order beam while passing a first-order diffracted beam emanating from a reconstructed off-axis hologram comprising:
   a. an off-axis hologram produced by radiation emanating from an object and interfering with a reference beam positioned at a selected angle with respect to said radiation from said object;
   b. a coherent light source for directing an incident beam on said off-axis hologram to produce therefrom a zero-order beam and a first-order diffracted beam;
   c. a first grid having opaque lines positioned in the zero-order and first-order beam; and
   d. a second grid positioned adjacent said first grid, said second grid having opaque lines positioned in said zero-order and first-order beams, said opaque lines of said second grid being positioned with respect to said opaque lines of said first grid to block off the zero-order beam while allowing the first-order beam to pass.

5. Apparatus for filtering out the zero-order beam while passing a first-order diffracted beam emanating from a reconstructed off-axis hologram comprising:
   a. an off-axis hologram produced by radiation emanating from an object and interfering with a reference beam positioned at a selected angle with respect to said radiation from said object;
   b. a coherent light source for directing an incident beam on said off-axis hologram to produce therefrom a zero-order beam and a first-order diffracted beam; and
   c. a plurality of vanes positioned at an angle with respect to the zero-order beam that corresponds to the selected angle of the reference beam used for forming said off-axis hologram.

6. A method of producing a second off-axis hologram from a first off-axis hologram, comprising the steps of:

a. illuminating the first off-axis hologram with a first beam of coherent light;
   b. directing only one first-order diffracted beam from the illuminated first off-axis hologram onto a detector; and
   c. illuminating said detector with a second beam of coherent light, said first beam being coherent with respect to said second beam.

7. A method of producing a second off-axis hologram from a first off-axis hologram according to claim 6, wherein the directed first-order diffracted beam carries an image from said first off-axis hologram.

8. A method of producing a second off-axis hologram from a first off-axis hologram according to claim 6, wherein the directed first-order diffracted beam carries a virtual image.

9. A method of producing a second off-axis hologram from a first off-axis hologram according to claim 6, wherein said second beam of coherent light and said first beam are selected so that said second off-axis hologram has a carrier frequency different from said first off-axis hologram.

10. A method of producing a second off-axis hologram from a first off-axis hologram according to claim 6 by magnifying the image obtained from illuminating the first off-axis hologram and directing said magnified image toward said detector so as to produce a second off-axis hologram of said magnified image.

11. A method of producing a second off-axis hologram from a first off-axis hologram, comprising the steps of:
 a. illuminating the first off-axis hologram with a first beam of coherent light;
 b. focusing only one first-order diffracted beam from the illuminated first off-axis hologram onto a detector; and
 c. illuminating said detector with a second beam of coherent light, said first beam being coherent with respect to said second beam.

12. A method of producing a second off-axis hologram from a first off-axis hologram comprising the steps of:
 a. illuminating the first off-axis hologram with a first beam of coherent light;
 b. positioning a detector to receive only one first-order diffracted beam from the illuminated first off-axis hologram, said detector being positioned at a distance sufficient for the image carried by the first-order beam to be focused by said first off-axis hologram; and
 c. directing a second beam of coherent light onto said detector, said first and second beams being coherent with respect to each other.

13. A method of producing a second off-axis hologram from a first off-axis hologram according to claim 11, wherein the first-order diffracted beam from the illuminated first off-axis hologram is focused so that the first off-axis hologram is imaged onto the detector.

14. Apparatus for producing a second off-axis hologram from a first off-axis hologram comprising:
 a. means for illuminating the first off-axis hologram with a first beam of coherent light;
 b. means for directing only one first-order diffracted beam from the illuminatined first off-axis hologram onto a detector; and
 c. means for illuminating said detector with a second beam of coherent light, said first beam being coherent with respect to said second beam.

15. Apparatus according to claim 14, wherein said directing means includes focusing means.

16. A method of producing elongated strip off-axis holograms comprising the steps of:
 a. directing a first beam of coherent light onto an object;
 b. positioning an elongated strip detector to receive light emanating from said object;
 c. directing a second beam of light to the position of said elongated strip detector, said second beam being coherent with respect to said first beam and being directed onto said elongated strip detector at a selected angle with respect to the light emanating from said object;
 d. exposing only a portion of said elongated strip detector to said second beam and said light emanating from said object to produce on said portion a pattern of interference fringes; and
 e. exposing subsequent portions of said elongated strip detector individually and in smooth transition at different angular positions with respect to said object, until said entire strip is exposed.

17. Apparatus for producing elongated strip off-axis holograms comprising:
 a. means for directing a first beam of coherent light onto an object;
 b. means for positioning an elongated strip detector to receive light emanating from said object;
 c. means for directing a second beam of light to the position of said elongated strip detector, said second beam being coherent with respect to said first beam;
 d. means for exposing only a portion of said elongated strip detector to said second beam and said light emanating from said object; and
 e. means including said last named means for exposing subsequent portions of said elongated strip detector individually and in smooth transition, until said entire strip is exposed.

* * * * *